US012735032B2

(12) United States Patent
Kameda et al.

(10) Patent No.: US 12,735,032 B2
(45) Date of Patent: Sep. 15, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Ryota Kameda, Tokyo (JP); Sho Tamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 33 days.

(21) Appl. No.: 19/050,145

(22) Filed: Feb. 11, 2025

(65) Prior Publication Data

US 2025/0304056 A1 Oct. 2, 2025

(30) Foreign Application Priority Data

Mar. 28, 2024 (JP) ................................ 2024-052870

(51) Int. Cl.
*B60W 30/12* (2020.01)

(52) U.S. Cl.
CPC ......... *B60W 30/12* (2013.01); *B60W 2552/53* (2020.02)

(58) Field of Classification Search
None
See application file for complete search history.

(56) References Cited

U.S. PATENT DOCUMENTS

2020/0307637 A1 10/2020 Oguro et al.
2022/0266857 A1* 8/2022 Tamura .................. G01C 21/30
2022/0315043 A1* 10/2022 Tamura ........... B60W 30/18163
(Continued)

FOREIGN PATENT DOCUMENTS

JP 2020-158077 10/2020
JP 2022-049595 3/2022
(Continued)

OTHER PUBLICATIONS

Japanese Office Action for Japanese Patent Application No. 2024-052870 mailed Nov. 11, 2025.

*Primary Examiner* — Anne Marie Antonucci
*Assistant Examiner* — Kyle S Park
(74) *Attorney, Agent, or Firm* — Amin, Turocy & Watson, LLP

(57) ABSTRACT

A vehicle control device includes a storage medium that stores computer-readable instructions, and a processor connected to the storage medium, in which the processor executes the computer-readable instructions to recognize a road marking and another vehicle present in a moving direction of a vehicle, determine whether the recognized road marking deviates from map road marking based on map information stored in a storage unit in a monitoring range, and in a case where determination is made that the deviation is generated, and the other vehicle is present in the monitoring range, select the road marking or the map road marking according to a traveling state of the other vehicle and perform traveling control for the vehicle according to the selected road marking or map road marking, and the processor sets the monitoring range to be small in a case where determination is made that the deviation in which a lane width of the road marking or the map road marking is widened is generated.

9 Claims, 7 Drawing Sheets

(56) References Cited

U.S. PATENT DOCUMENTS

| | | | |
|---|---|---|---|
| 2023/0303126 | A1 | 9/2023 | Tamura et al. |
| 2024/0051531 | A1 | 2/2024 | Inoue et al. |

FOREIGN PATENT DOCUMENTS

| | | |
|---|---|---|
| JP | 2023-143322 | 10/2023 |
| JP | 2023-148405 | 10/2023 |
| JP | 2024-025478 | 2/2024 |

* cited by examiner

FIG. 2

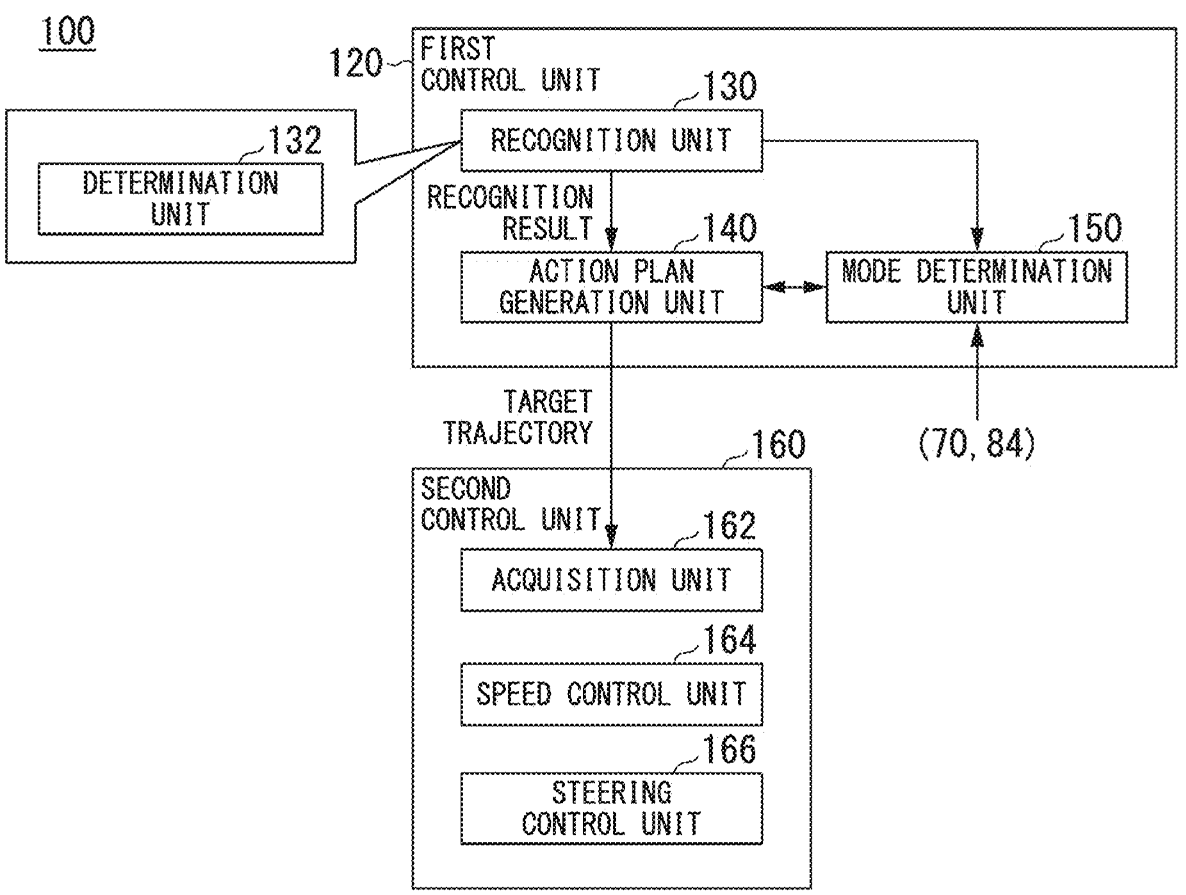

FIG. 3

| DRIVING MODE | CONTROL STATE | TASK |
|---|---|---|
| MODE A | AUTONOMOUS DRIVING | FRONT MONITORING: NOT REQUIRED<br>STEERING GRIPPING: NOT REQUIRED |
| MODE B | DRIVING ASSISTANCE | FRONT MONITORING: REQUIRED<br>STEERING GRIPPING: NOT REQUIRED |
| MODE C | DRIVING ASSISTANCE | FRONT MONITORING: REQUIRED<br>STEERING GRIPPING: REQUIRED |
| MODE D | DRIVING ASSISTANCE | FRONT MONITORING: REQUIRED<br>AT LEAST DRIVING OPERATION OF CERTAIN DEGREE IS REQUIRED |
| MODE E | MANUAL DRIVING | FRONT MONITORING: REQUIRED<br>DRIVING OPERATION IS REQUIRED IN RELATION TO BOTH STEERING AND ACCELERATION/DECELERATION |

TASK: LIGHT

TASK: HEAVY

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2024-052870, filed on Mar. 28, 2024, the contents of which are incorporated herein by reference.

BACKGROUND

Field of the Invention

The present invention relates to a vehicle control device, a vehicle control method, and a storage medium.

Description of Related Art

In recent years, efforts have been actively made to provide access to a sustainable transportation system with special attention to people in vulnerable situations among traffic participants. To implement this, research and development for further improving the safety or convenience of traffic through research and development regarding an autonomous driving technique has been focused on.

Incidentally, in the autonomous driving technique, there is a case where a preceding vehicle present in a moving direction of a host vehicle is detected, and traveling control for the host vehicle is performed such that the host vehicle follows the detected preceding vehicle. For example, Japanese Unexamined Patent Application, First Publication No. 2022-49595 discloses a technique for performing determination about whether a host vehicle would be brought into a hazardous state by following the preceding vehicle in a case where lateral movement of a preceding vehicle is detected, and permitting the host vehicle to follow the preceding vehicle in a case where determination is made that the host vehicle would not be brought into the hazardous state by following the preceding vehicle.

On the other hand, for example, in a case where a lane width (for example, the number of lanes) of a lane on which the host vehicle and the preceding vehicle travel is wide, a lane on which the host vehicle travels and a lane on which the preceding vehicle travels may be different. In this case, in the related art, the host vehicle refers to a trajectory of the following target preceding vehicle, so that a road marking recognized by a camera may be pulled to the lane on which the preceding vehicle travels, and may deviate from a road marking recognized by map information. As a result, the host vehicle may depart from a lane on which the host vehicle should be traveling or the level of autonomous driving may be lowered against an intention.

SUMMARY

The present invention has been accomplished in consideration of such a situation, and an object of the present invention is to provide a vehicle control device, a vehicle control method, and a storage medium capable of continuing traveling control for a host vehicle even as appropriate in a case where a trajectory of a preceding vehicle deviates from the host vehicle. The present invention, in turn, contributes to development of a sustainable transportation system.

A vehicle control device according to the invention employs the following configuration.

(1) A vehicle control device according to an aspect of the invention includes a storage medium that stores computer-readable instructions, and a processor connected to the storage medium, in which the processor executes the computer-readable instructions to recognize a road marking and another vehicle present in a moving direction of a vehicle, determine whether the recognized road marking deviates from a map road marking based on map information stored in a storage unit in a monitoring range, and in a case where determination is made that the deviation is generated, and the other vehicle is present in the monitoring range, select the road marking or the map road marking according to a traveling state of the other vehicle and perform traveling control for the vehicle according to the selected road marking or map road marking, and the processor sets the monitoring range to be small in a case where determination is made that the deviation in which a lane width of the road marking or the map road marking is widened is generated.

(2) In the aspect of (1) described above, the deviation in which the lane width of the road marking or the map road marking is widened is a deviation in which the lane width is gradually widened from a side close to the vehicle toward a side far from the vehicle in relation to the moving direction of the vehicle.

(3) In the aspect of (1) described above, the processor sets the monitoring range to be small in a case where one of right and left sides of the road marking deviates to be widened from the corresponding map road marking in relation to the moving direction of the vehicle.

(4) In the aspect of (1) described above, the processor changes the monitoring range according to a vehicle speed of the vehicle.

(5) In the aspect of (4) described above, the processor sets a longitudinal distance of the monitoring range to a value smaller than an inter-vehicle distance set for traveling to follow the other vehicle in a case where determination is made that the deviation in which the lane width of the road marking or the map road marking is widened is generated.

(6) In the aspect of (5) described above, the processor sets the longitudinal distance of the monitoring range to a given value in a case where determination is made that the deviation in which the lane width of the road marking or the map road marking is widened is generated, and the vehicle speed of the vehicle is equal to or lower than a prescribed value.

(7) In the aspect of (1) described above, the processor determines whether the vehicle is positioned on a branch road, and in a case where determination is made that the vehicle is positioned on the branch road, does not set the monitoring range to be small even in a case where determination is made that the deviation in which the lane width of the road marking or the map road marking is widened is generated.

(8) A vehicle control method according to another aspect of the invention includes, by a computer mounted in a vehicle, recognizing a road marking and another vehicle present in a moving direction of the vehicle, determining whether the recognized road marking deviates from map road marking based on map information stored in a storage unit in a monitoring range, in a case where determination is made that the deviation is generated, and the other vehicle is present in the monitoring range, selecting the road marking or the map road marking according to a traveling state of the other vehicle and performing traveling control for the vehicle according to the selected road marking or map road marking, and setting the monitoring range to be small in a case where determination is made that the deviation in which a lane width of the road marking or the map road marking is widened is generated.

(9) A computer-readable non-transitory storage medium according to still another aspect of the present invention stores a program for causing a computer mounted in a vehicle to recognize a road marking and another vehicle present in a moving direction of the vehicle, determine whether the recognized road marking deviates from map road marking based on map information stored in a storage unit in a monitoring range, in a case where determination is made that the deviation is generated, and the other vehicle is present in the monitoring range, select the road marking or the map road marking according to a traveling state of the other vehicle and perform traveling control for the vehicle according to the selected road marking or map road marking, and set the monitoring range to be small in a case where determination is made that the deviation in which a lane width of the road marking or the map road marking is widened is generated.

According to the aspect of (1) or (2) described above, it is possible to prevent misrecognition that a road marking in line with movement of lane change by a preceding vehicle is correct when a lane width of a road on which a host vehicle travels is widened.

According to the aspect of (3) described above, it is possible to prevent misrecognition that the road marking in line with movement of lane change by the preceding vehicle is correct when the number of lanes of the road on which the host vehicle travels increases.

According to the aspect of (4) described above, it is possible to appropriately set a determination range of a deviation between a camera road marking and a map road marking required for traveling control.

According to the aspect of (5) described above, it is possible to prevent an adverse effect of another vehicle on traveling control for the host vehicle during following traveling.

According to the aspect of (6) described above, it is possible to appropriately set a determination range of a deviation between a camera road marking and a map road marking required for traveling control while preventing an adverse effect of another vehicle on traveling control for the host vehicle during following traveling.

According to the aspects of (1) to (8) described above, it is possible to appropriately continue traveling control for the host vehicle even in a case where a trajectory of the preceding vehicle deviates from the host vehicle.

BRIEF DESCRIPTION OF THE DRAWINGS

FIG. 2 is a functional configuration diagram of a first control unit and a second control unit.

FIG. 3 is a diagram illustrating a correspondence relationship of a driving mode, a control state of a host vehicle, and a task.

DESCRIPTION OF EMBODIMENTS

Hereinafter, an embodiment of a vehicle control device, a vehicle control method, and a storage medium of the present invention will be described with reference to the drawings.

Overall Configuration

Figure 1:
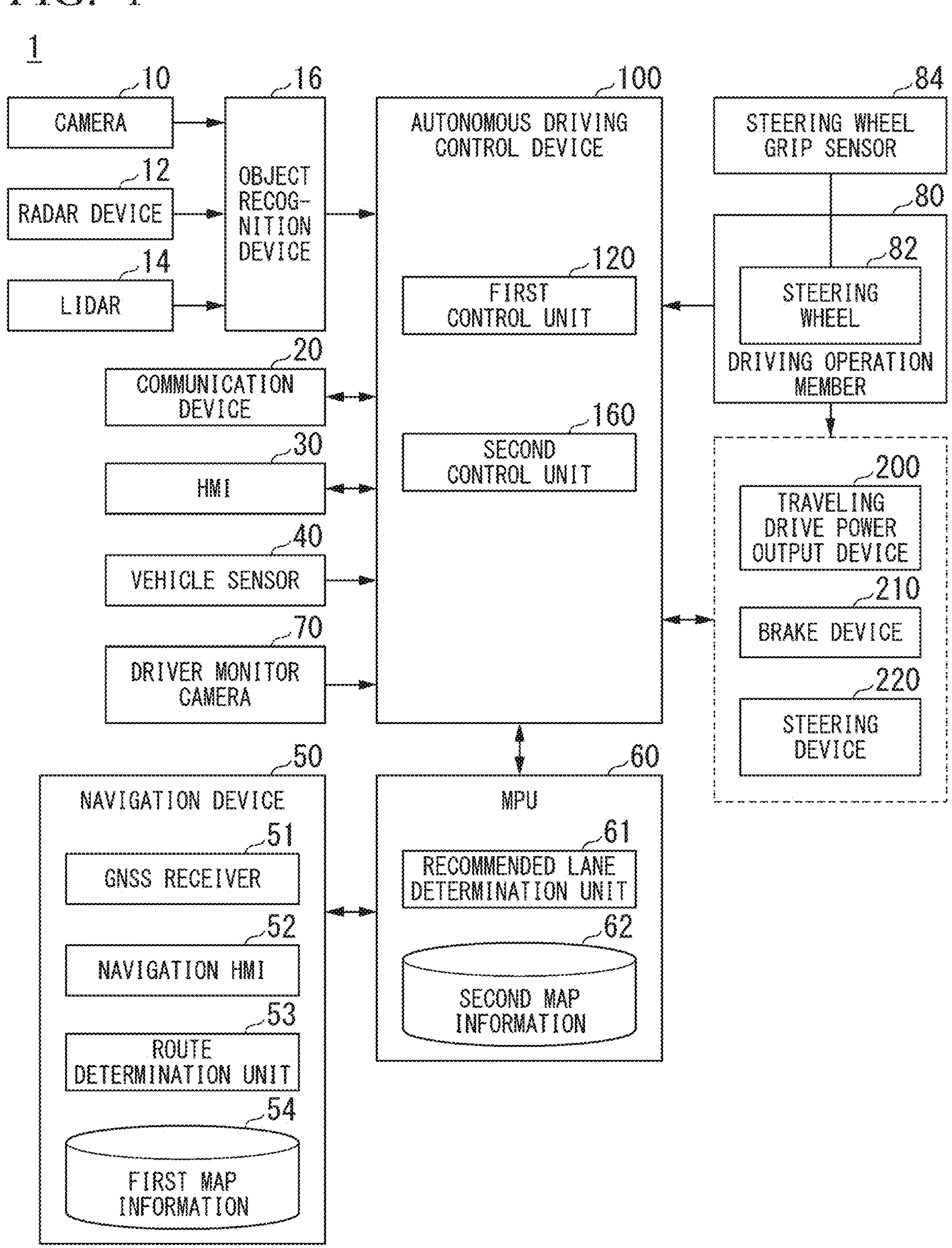
FIG. 1 is a configuration diagram of a vehicle system using a vehicle control device according to an embodiment.

FIG. 1 is a configuration diagram of a vehicle system 1 using the vehicle control device according to the embodiment. A vehicle in which the vehicle system 1 is mounted is, for example, a two-wheeled, three-wheeled, or four-wheeled vehicle, and a drive source thereof is an internal combustion engine such as a diesel engine or a gasoline engine, an electric motor, or a combination thereof. The electric motor operates using electric power generated by a generator coupled to the internal combustion engine or electric power discharged from a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitor camera 70, a driving operation member 80, an autonomous driving control device 100, a traveling drive power output device 200, a brake device 210, and a steering device 220. These devices and apparatuses are connected to each other by a multiplex communication line such as a controller area network (CAN) communication line, a serial communication line, or a wireless communication network. The configuration shown in FIG. 1 is merely an example, and a part of the configuration may be omitted or another configuration may be added.

The camera 10 is, for example, a digital camera using a solid-state imaging element such as a charge coupled device (CCD) or a complementary metal oxide semiconductor (CMOS). The camera 10 is attached at any place on a vehicle (hereinafter, referred to as a host vehicle M) in which the vehicle system 1 is mounted. In imaging the front, the camera 10 is attached to an upper portion of a front windshield, a back surface of a rear-view mirror, or the like. The camera 10 periodically and repeatedly images, for example, the vicinity of the host vehicle M. The camera 10 may be a stereo camera.

The radar device 12 radiates radio waves such as millimeter waves to the vicinity of the host vehicle M, and detects radio waves (reflected waves) reflected by an object to detect at least a position of (a distance to and a direction of) the object. The radar device 12 is attached at any place on the host vehicle M. The radar device 12 may detect a position and a speed of an object by a frequency modulated continuous wave (FM-CW) method.

The LIDAR 14 emits light (or electromagnetic waves with a wavelength close to that of light) to the vicinity of the host vehicle M and measures scattered light. The LIDAR 14 detects a distance to a target on the basis of a time from light emission to light reception. The emitted light is, for example, pulsed laser light. The LIDAR 14 is attached at any place on the host vehicle M.

The object recognition device 16 executes sensor fusion processing on detection results of a part or all of the camera 10, the radar device 12, and the LIDAR 14 to recognize a position, a type, a speed, and the like of an object. The object recognition device 16 outputs a recognition result to the autonomous driving control device 100. The object recognition device 16 may output the detection results of the camera 10, the radar device 12, and the LIDAR 14 to the autonomous driving control device 100 without change. The object recognition device 16 may be omitted from the vehicle system 1.

The communication device 20 communicates with another vehicle in the vicinity of the host vehicle M using, for example, a cellular network, a Wi-Fi network, Bluetooth (Registered Trademark), or dedicated short range communication (DSRC) or communicates with various server devices via a wireless base station.

The HMI 30 presents various kinds of information to an occupant of the host vehicle M, and receives an input operation by the occupant. The HMI 30 includes various display devices, a speaker, a buzzer, a touch panel, a switch, keys, and the like.

The vehicle sensor 40 includes a vehicle speed sensor that detects a speed of the host vehicle M, an acceleration sensor that detects an acceleration, a yaw rate sensor that detects an angular velocity around a vertical axis, an azimuth sensor that detects a direction of the host vehicle M, and the like.

The navigation device 50 includes, for example, a global navigation satellite system (GNSS) receiver 51, a navigation HMI 52, and a route determination unit 53. The navigation device 50 stores first map information 54 in a storage device such as a hard disk drive (HDD) or a flash memory. The GNSS receiver 51 specifies a position of the host vehicle M on the basis of signals received from GNSS satellites. The position of the host vehicle M may be specified or completed by an inertial navigation system (INS) using an output of the vehicle sensor 40. The navigation HMI 52 includes a display device, a speaker, a touch panel, keys, and the like. The navigation HMI 52 may be partially or entirely shared with the HMI 30 described above. The route determination unit 53 determines a route (hereinafter, referred to as an on-map route) from the position of the host vehicle M specified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include a curvature of a road, point of interest (POI) information, or the like. The on-map route is output to the MPU 60. The navigation device 50 may perform route guidance using the navigation HMI 52 on the basis of the on-map route. The navigation device 50 may be implemented by, for example, a function of a terminal device such as a smartphone or a tablet terminal owned by the occupant. The navigation device 50 may transmit a current position and a destination to a navigation server via the communication device 20 and may acquire a route equivalent to the on-map route from the navigation server.

The MPU 60 includes, for example, a recommended lane determination unit 61, and stores second map information 62 in a storage device such as an HDD or a flash memory. The recommended lane determination unit 61 divides the on-map route provided from the navigation device 50 into a plurality of blocks (for example, divides the on-map route every 100 [m] in a vehicle moving direction), and determines a recommended lane for each block with reference to the second map information 62. The recommended lane determination unit 61 performs determination which lane from the left the vehicle travels on. When a branch point is present on the on-map route, the recommended lane determination unit 61 determines a recommended lane such that the host vehicle M can travel along a reasonable route for advancing to a branch destination.

The second map information 62 is map information with higher accuracy than the first map information 54. The second map information 62 includes, for example, information on a center of a lane, information on a boundary of a lane, or the like. The second map information 62 may include road information, traffic regulation information, address information (address or zip code), facility information, telephone number information, information on a prohibited section where a mode A or a mode B described below is prohibited, or the like. The second map information 62 may be updated at any time by the communication device 20 communicating with another device.

The driver monitor camera 70 is, for example, a digital camera using a solid-state imaging element such as a CCD or a CMOS. The driver monitor camera 70 is attached at any place on the host vehicle M in a position and a direction in which the head of an occupant (hereinafter, referred to as a driver) seated in a driver's seat of the host vehicle M is able to be imaged from the front (in a direction in which the face is imaged). For example, the driver monitor camera 70 is attached to an upper portion of a display device provided in a center portion of an instrument panel of the host vehicle M.

The driving operation member 80 includes, for example, an accelerator pedal, a brake pedal, a shift lever, and other operation members, in addition to a steering wheel 82. A sensor that detects an operation amount or the presence or absence of an operation is attached to the driving operation member 80, and a detection result thereof is output to the autonomous driving control device 100 or a part or all of the traveling drive power output device 200, the brake device 210, and the steering device 220. The steering wheel 82 is an example of an "operation member that receives a steering operation by the driver." The operation member is not necessarily in an annular shape, and may be in a form of a deformed steering wheel, a joystick, a button, or the like. A steering wheel grip sensor 84 is attached to the steering wheel 82. The steering wheel grip sensor 84 is implemented by a static capacitance sensor or the like, and outputs, to the autonomous driving control device 100, a signal capable of detecting whether the driver is gripping the steering wheel 82 (meaning that the driver is in contact with the steering wheel 82 in a state of applying force to the steering wheel 82).

The autonomous driving control device 100 includes, for example, a first control unit 120 and a second control unit 160. Each of the first control unit 120 and the second control unit 160 is implemented by, for example, a hardware processor such as a central processing unit (CPU) executing a program (software). A part or all of these components may be implemented by software (circuit part, including circuitry) such as large scale integration (LSI), an application specific integrated circuit (ASIC), a field-programmable gate array (FPGA), a graphics processing unit (GPU), or a system on chip (SOC), or may be implemented by software and hardware in cooperation. The program may be stored in advance in a storage device (a storage device including a non-transitory storage medium) such as an HDD or a flash memory of the autonomous driving control device 100 or may be stored in a removable storage medium such as a DVD or a CD-ROM and may be installed on the HDD or the flash memory of the autonomous driving control device 100 when the storage medium (non-transitory storage medium) is loaded into a drive device. The autonomous driving control device 100 including a determination unit 132 and a correction unit 134 described below is an example of a "vehicle control device".

FIG. 2 is a functional configuration diagram of the first control unit 120 and the second control unit 160. The first control unit 120 includes, for example, a recognition unit 130, a determination unit 132, an action plan generation unit 140, and a mode determination unit 150. The first control unit 120 simultaneously implements, for example, functions by artificial intelligence (AI) and functions by a model given in advance. For example, a function of "recognizing an intersection" may be implemented by simultaneously executing recognition of an intersection by deep learning or the like and recognition based on conditions given in advance (a signal, a road sign, and the like that can be used for pattern matching) and scoring both recognitions to comprehensively evaluate the recognitions. Accordingly, the reliability of autonomous driving is secured.

The recognition unit 130 recognizes a position and a state such as a speed or an acceleration of an object in the vicinity of the host vehicle M on the basis of information input from the camera 10, the radar device 12, and the LIDAR 14 via the object recognition device 16. A position of an object is recognized as, for example, a position on absolute coordinates with a representative point (a center of gravity, a drive axis center, or the like) of the host vehicle M as an origin and is used for control. The position of the object may be represented as a representative point such as a center of gravity or a corner of the object or may be represented as a region. A "state" of an object may include an acceleration or a jerk of an object or an "action state" of an object (for example, whether an object is changing a lane or is about to change a lane).

The recognition unit 130 recognizes, for example, a lane (traveling lane) on which the host vehicle M is traveling. For example, the recognition unit 130 recognizes a traveling lane by comparing a pattern (hereinafter, referred to as a "map road marking") of a road marking obtained from the second map information 62 with a pattern (hereinafter, referred to as a "camera road marking") of a road marking in the vicinity of the host vehicle M recognized from an image captured by the camera 10 in a monitoring range (comparison range). Here, the monitoring range may be a detection limit range of the recognition unit 130 or may be a part of the detection limit range. In a case where another vehicle is traveling in the monitoring range in front of the host vehicle M, the recognition unit 130 may determine a camera road marking for comparison with a map road marking with reference to a trajectory of another vehicle. For example, the recognition unit 130 may determine, as a camera road marking, a marking in line with a trajectory (speed) direction of another vehicle among a plurality of markings to be a candidate of a camera road marking.

The determination unit 132 of the recognition unit 130 calculates, for example, a deviation between the camera road marking and the map road marking in the monitoring range, and in a case where determination is made that the calculated deviation is equal to or less than a prescribed value (that is, in a case where determination is made that the camera road marking and the map road marking match each other), recognizes at least one (or a center line) of the map road marking and the camera road marking as a road marking forming a traveling lane. Here, the deviation may be, for example, an angle between the map road marking and the camera road marking or may be a distance between the map road marking and the camera road marking. In calculating the deviation between the map road marking and the camera road marking, for example, one or more representative points may be extracted from each of the map road marking and the camera road marking in the monitoring range, and a distance between the representative points may be defined as a deviation. In this way, since the monitoring range is set for recognition processing required for executing autonomous driving or driving assistance, the determination unit 132 sets a monitoring range (in particular, a monitoring distance in front of the host vehicle M in the moving direction) according to the speed of the host vehicle M. More specifically, in a case where the speed of the host vehicle M is high, the determination unit 132 sets the monitoring range large, and in a case where the speed of the host vehicle M is low, the determination unit 132 sets the monitoring range to be small. The recognition unit 130 may recognize a traveling lane by recognizing a road boundary including a road marking, a road shoulder, a curbstone, a median strip, a guard rail, and the like, instead of a road marking. In the recognition, the position of the host vehicle M acquired from the navigation device 50 or a processing result by the INS may be taken into consideration. The recognition unit 130 recognizes a temporary stop line, an obstacle, a red signal, a toll gate, and other road events.

In recognizing a traveling lane, the recognition unit 130 recognizes a position or a posture of the host vehicle M with respect to the traveling lane. The recognition unit 130 may recognize a deviation of a reference point of the host vehicle M from the center of the lane and an angle with respect to a line in which the center of the lane in the moving direction of the host vehicle Mis aligned, as a relative position and a posture of the host vehicle M with respect to the traveling lane. Alternatively, the recognition unit 130 may recognize a position or the like of the reference point of the host vehicle M with respect to any side end portion (road marking or road boundary) of the traveling lane as a relative position of the host vehicle M with respect to the traveling lane.

The action plan generation unit 140 basically travels on a recommended lane determined by the recommended lane determination unit 61, and generates a target trajectory along which the host vehicle M will autonomously travel (without depending on an operation of the driver) in the future to avoid an approach to an object (excluding an object such as a road marking, a road sign, or a manhole that the vehicle can climb over) recognized by the recognition unit 130. For example, the recognition unit 130 sets a risk region centered on an object of which the state is output, and in the risk region, a risk is set by the recognition unit 130 as an index value indicating a degree to which the host vehicle M is not to approach. The action plan generation unit 140 generates a target trajectory such that the host vehicle M does not pass through a point where the risk is equal to or greater than a prescribed value and travels in the recognized traveling lane. Since the object includes a moving object, the distribution of the risk is not one per control cycle, and is set for a plurality of future time points in consideration of a future position of the object predicted on the basis of a speed of the object. For example, the target trajectory is expressed by sequentially arranging points (trajectory points) that the host vehicle M will reach. The trajectory points are points that the host vehicle M will reach at each prescribed traveling distance (for example, about several [m]) in a road distance, and separately, a target speed and a target acceleration at each prescribed sampling time (for example, about several tenths of a [sec]) are generated as a part of the target trajectory. The trajectory points may be positions that the host vehicle M will reach within a prescribed sampling time at each sampling time. In this case, information on the target speed or the target acceleration is expressed by an interval of the trajectory points.

In the present embodiment, in a case where the determination unit 132 determines that the map road marking and the camera road marking match each other on at least one side, the action plan generation unit 140 generates a target trajectory such that the host vehicle M travels along (in consideration of at least) the map road marking and the camera road marking matching each other. As an example, the action plan generation unit 140 generates a target trajectory such that the host vehicle M travels at a point shifted by a prescribed distance from the map road marking and the camera road marking matching each other. For example, in a case where determination is made that the map road marking and the camera road marking match each other on both sides, the action plan generation unit 140 generates a center line of both sides of the map road marking or the camera road marking as a target trajectory.

In the present embodiment, in a case where the determination unit 132 determines that a deviation is generated between the camera road marking and the map road marking (this includes a case where the camera road marking and the map road marking do not match each other and a case where a deviation is generated between the camera road marking and the map road marking while determination is not made that the camera road marking and the map road marking do not match each other), the action plan generation unit 140 selects any one of the camera road marking and the map road marking, and generates a target trajectory such that the host vehicle M travels along (in consideration of at least) the selected camera road marking or map road marking. For example, in a case where the camera road marking and the map road marking deviate from each other on one side, and another vehicle is traveling in the moving direction in front of the host vehicle M, the action plan generation unit 140 selects the camera road marking or the map road marking according to a traveling state (a trajectory, a speed, or the like) of another vehicle. As an example, the action plan generation unit 140 calculates an angle difference between the trajectory (speed) of another vehicle and each of the camera road marking and the map road marking, selects a marking having a smaller angle difference, and uses the selected marking to generate a target trajectory.

The action plan generation unit 140 may set an event of autonomous driving in generating the target trajectory. The event of autonomous driving includes a constant speed traveling event, a low speed following traveling event, a lane change event, a branching event, a merging event, a takeover event, and the like. The action plan generation unit 140 generates a target trajectory according to an activated event.

The mode determination unit 150 determines a driving mode of the host vehicle M to any of a plurality of driving modes in which tasks imposed on the driver are different. FIG. 3 is a diagram showing an example of a correspondence relationship of a driving mode, a control state of the host vehicle M, and a task. The driving mode of the host vehicle M is, for example, five modes of a mode A to a mode E. The control state, that is, a degree of automation of driving control for the host vehicle M is highest in the mode A, decreases in the order of the mode B, the mode C, and the mode D, and is lowest in the mode E. In contrast, the task imposed on the driver is lightest in the mode A, gets heavier in the order of the mode B, the mode C, and the mode D, and is heaviest in the mode E. In the modes D and E, since the control state is not autonomous driving, the autonomous driving control device 100 is responsible for ending control related to autonomous driving and shifting to driving assistance or manual driving. Hereinafter, the contents of each driving mode will be illustrated.

In the mode A, the vehicle is in a state of autonomous driving, and neither front monitoring nor gripping (in the drawing, steering gripping) of the steering wheel 82 is imposed on the driver. However, even in the mode A, the driver is required to be in a posture capable of quickly shifting to manual driving in response to a request from a system centered on the autonomous driving control device 100. The autonomous driving as used herein means that both steering and acceleration/deceleration are controlled without depending on a driver's operation. The front means a space in the moving direction of the host vehicle M to be visually recognized via the front windshield. The mode A is, for example, a driving mode that can be executed in a case where a condition that the host vehicle M is traveling at a prescribed speed (for example, about 50 [km/h] or less) on an expressway such as a highway, and a following target preceding vehicle is present is satisfied, and may be called traffic jam pilot (TJP). In a case where the condition is not satisfied, the mode determination unit 150 changes the driving mode of the host vehicle M to the mode B.

In the mode B, the vehicle is in a state of driving assistance, and a task (hereinafter, referred to as front monitoring) of monitoring the front of the host vehicle M is imposed on the driver, but a task of gripping the steering wheel 82 is not imposed on the driver. In the mode C, the vehicle is in a state of driving assistance, and the task of front monitoring and the task of gripping the steering wheel 82 are imposed on the driver. The mode D is a driving mode in which the driver is required to perform a driving operation of a certain degree in relation to at least one of steering and acceleration/deceleration of the host vehicle M. For example, in the mode D, driving assistance such as adaptive cruise control (ACC) or lane keeping assist system (LKAS) is performed. In the mode E, the vehicle is in a state of manual driving in which the driver is required to perform a driving operation in relation to both steering and acceleration/deceleration. In both the mode D and the mode E, the task of monitoring the front of the host vehicle Mis of course imposed on the driver.

The driving mode is not limited to the modes illustrated in FIG. 3, and may be specified by other definitions. For example, in a driving mode in which both front monitoring and steering gripping are required, a threshold for determination that the steering wheel is gripped may be loose or severe. More specifically, while the driver may touch the steering wheel 82 with any of right and left hands in a certain driving mode, in another driving mode in which the task imposed on the driver is heavier, the driving mode may be defined such that the driver is required to grip the steering wheel 82 with both hands at a strength of the threshold or more. In addition, driving modes in which the heaviness of the task imposed on the driver is different may be defined in any way.

The autonomous driving control device 100 (and a driving assistance device (not shown)) executes automated lane change according to a driving mode. The automated lane change includes automated lane change (1) according to a system request and automated lane change (2) according to a driver request. The automated lane change (1) includes automated lane change for passing and is performed in a case where a speed of a preceding vehicle is slower than the speed of the host vehicle by a reference or the more, and automated lane change for moving toward a destination (automated lane change due to a change in recommended lane). The automated lane change (2) involves making the host vehicle M change the lane toward in an operation direction when a direction indicator is operated by the driver in a case where a condition regarding a speed or a positional relationship with a surrounding vehicle is satisfied.

The autonomous driving control device 100 does not execute either of the automated lane change (1) or (2) in the mode A. The autonomous driving control device 100 executes both the automated lane changes (1) and (2) in the modes B and C. The driving assistance device (not shown) does not execute the automated lane change (1) and executes the automated lane change (2) in the mode D. In the mode E, both the automated lane changes (1) and (2) are not executed.

The mode determination unit 150 changes the driving mode of the host vehicle M to a driving mode in which the task is heavier in a case where the task related to the determined driving mode (hereinafter, referred to as a current driving mode) is not executed by the driver.

For example, in a case where the driver is in a posture where the driver cannot shift to manual driving in response to a request from the system in the mode A (for example, in a case where the driver continues to look outside a permissible area or in a case where a sign that driving becomes difficult is detected), the mode determination unit 150 performs control for prompting the driver to shift to manual driving using the HMI 30. When the driver does not respond, the mode determination unit 150 performs control such that the host vehicle M is moved closer to a road shoulder and is gradually stopped, and autonomous driving is stopped. After the autonomous driving is stopped, the host vehicle is in the mode D or E, and the host vehicle M can be started by a manual operation of the driver. Hereinafter, the same applies to "stopping of autonomous driving". In a case where the driver is not monitoring the front in the mode B, the mode determination unit 150 performs control for prompting the driver to monitor the front using the HMI 30. When the driver does not respond, the mode determination unit 150 performs control such that the host vehicle M is moved closer to a road shoulder and is gradually stopped, and autonomous driving is stopped. In the mode C, in a case where the driver is not monitoring the front or in a case where the driver is not gripping the steering wheel 82, the mode determination unit 150 performs control for prompting the driver to monitor the front and/or to grip the steering wheel 82 using the HMI 30. When the driver does not respond, the mode determination unit 150 performs control such that the host vehicle M is moved closer to a road shoulder and is gradually stopped, and autonomous driving is stopped.

The mode determination unit 150 further monitors a state of the driver to perform the mode change and determines whether the state of the driver is a state according to the task. For example, the mode determination unit 150 analyzes an image captured by the driver monitor camera 70 to execute posture estimation processing and determines whether the driver is in a posture where the driver cannot shift to manual driving in response to a request from the system. The mode determination unit 150 analyzes an image captured by the driver monitor camera 70 to execute line-of-sight estimation processing and determines whether the driver is monitoring the front.

In the present embodiment, in a case where the determination unit 132 determines that the map road marking and the camera road marking do not match each other, the mode determination unit 150 changes the driving mode of the host vehicle M to a driving mode in which the task is heavier. For example, in a case where determination is made that the map road marking and the camera road marking do not match each other on both sides while the host vehicle M is traveling in a driving mode (the mode A or the mode B) in which steering gripping is not required, the mode determination unit 150 changes the driving mode to a mode of the mode C or lower. In a case where the determination unit 132 determines that the map road marking and the camera road marking do not match each other on only one side, the mode determination unit 150 may lower the level of the driving mode or may continue the current driving mode based on the map road marking and the camera road marking matching each other.

The mode determination unit 150 further executes various kinds of processing for the mode change. For example, the mode determination unit 150 instructs the action plan generation unit 140 to generate a target trajectory for stopping at a road shoulder, instructs the driving assistance device (not shown) to operate, or controls the HMI 30 to prompt the driver to perform an action.

The second control unit 160 controls the traveling drive power output device 200, the brake device 210, and the steering device 220 such that the host vehicle M passes the target trajectory generated by the action plan generation unit 140 at a scheduled time.

Returning to FIG. 2, the second control unit 160 includes, for example, an acquisition unit 162, a speed control unit 164, and a steering control unit 166. The acquisition unit 162 acquires information on the target trajectory (trajectory points) generated by the action plan generation unit 140 and stores the acquired information in a memory (not shown). The speed control unit 164 controls the traveling drive power output device 200 or the brake device 210 on the basis of a speed element associated with the target trajectory stored in the memory. The steering control unit 166 controls the steering device 220 according to a degree of curving of the target trajectory stored in the memory. The processing of the speed control unit 164 and the steering control unit 166 is implemented by, for example, a combination of feedforward control and feedback control. As an example, the steering control unit 166 executes feedforward control according to a curvature of a road in front of the host vehicle M and feedback control based on a deviation from the target trajectory in combination.

The traveling drive power output device 200 outputs traveling drive power (torque) for a vehicle to travel to drive wheels. The traveling drive power output device 200 includes, for example, a combination of an internal combustion engine, an electric motor, a transmission, and the like, and an electronic control unit (ECU) that controls the internal combustion engine, the electric motor, the transmission, and the like. The ECU controls the above-described configuration according to information input from the second control unit 160 or information input from the driving operation member 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the second control unit 160 or information input from the driving operation member 80 such that brake torque according to a braking operation is output to each wheel. The brake device 210 may include, as a backup, a mechanism that transmits hydraulic pressure generated by an operation of a brake pedal included in the driving operation member 80 to the cylinder via a master cylinder. The brake device 210 is not limited to the configuration described above, and may be an electronically controlled hydraulic brake device that controls an actuator according to information input from the second control unit 160 to transmit hydraulic pressure of the master cylinder to the cylinder.

The steering device 220 includes, for example, a steering ECU and an electric motor. The electric motor applies force to a rack-and-pinion mechanism to change a direction of turning wheels. The steering ECU drives the electric motor according to information input from the second control unit 160 or information input from the driving operation member 80 and changes the direction of the turning wheels.

Processing when Lane Width Increases

As described above, the determination unit 132 compares the map road marking with the camera road marking in the monitoring range, and in a case where determination is made that the map road marking and the camera road marking do not match each other, the mode determination unit 150 changes the driving mode of the host vehicle M to a driving mode in which the task is heavier. However, in the related art, as an example, in a case where the number of lanes of a road on which the host vehicle M travels increases, and another vehicle traveling in front of the host vehicle M performs lane change to an increased lane, the recognition unit 130 may misrecognize a road marking of the increased lane as a camera road marking of a current lane with reference to the traveling state (a trajectory, a speed, or the like) of another vehicle, and may use the misrecognized camera road marking for comparison with the map road marking.

Figure 4:
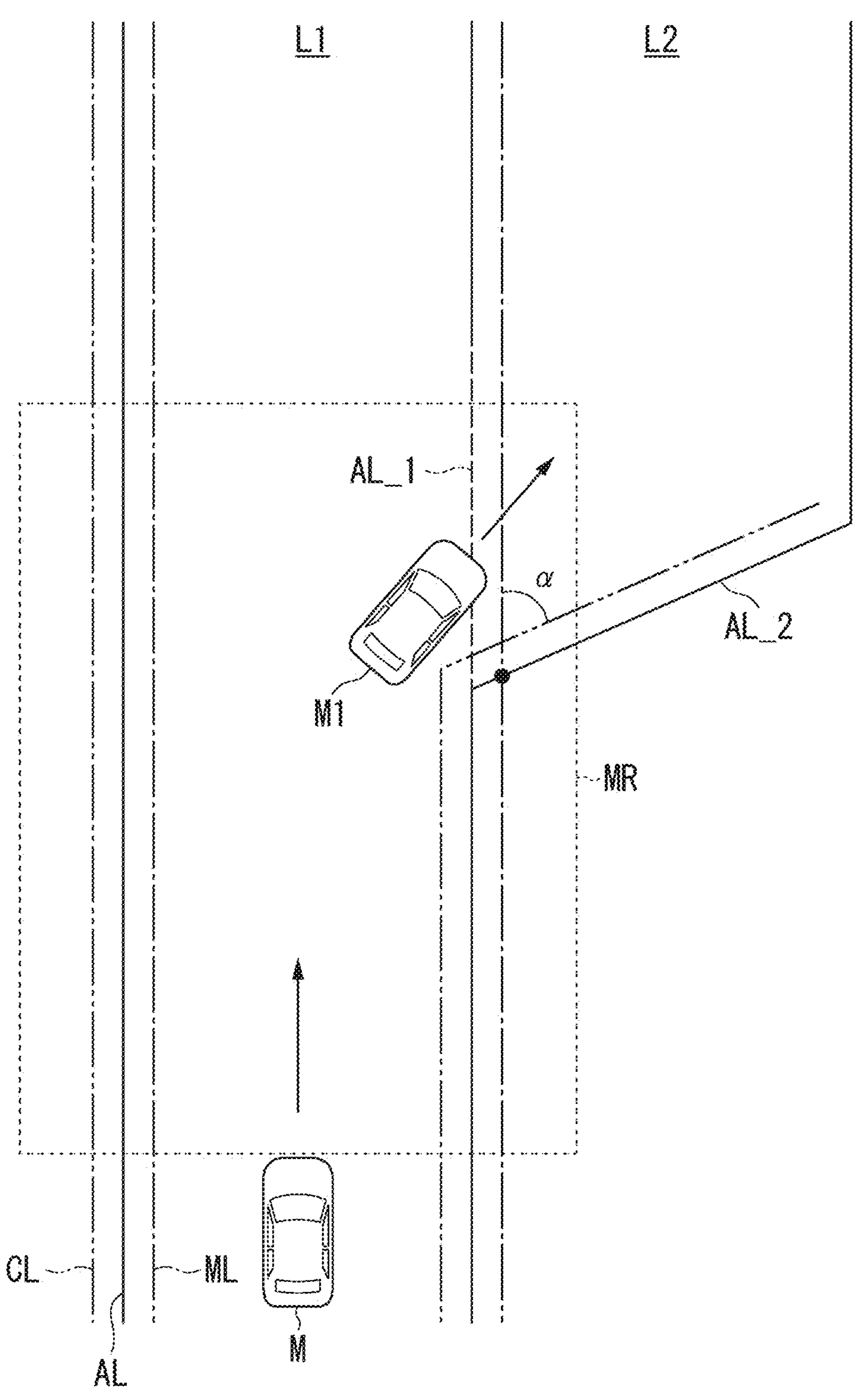
FIG. 4 is a diagram illustrating a problem in the related art that occurs due to lane change of another vehicle to another lane when a lane width increases.

FIG. 4 is a diagram illustrating a problem in the related art that occurs due to lane change of another vehicle to another lane when a lane width increases. In FIG. 4, a symbol CL represents a camera road marking, a symbol ML represents a map road marking, a symbol AL represents an actual road marking, a symbol MR represents a monitoring range of the camera road marking CL and the map road marking ML, symbols L1 and L2 represent lanes, and a symbol M1 represents another vehicle traveling in front of the host vehicle M. FIG. 4 shows a situation in which another vehicle M1 that is traveling on a lane L1 performs lane change from the lane L1 to a lane L2 according to an increase in the number of lanes.

As shown in FIG. 4, in a case where another vehicle M1 performs lane change from the lane L1 to the lane L2, a trajectory (speed) of another vehicle M1 is directed toward an actual road marking AL_2 of the lane L2 rather than the actual road marking AL_1 of the lane L1. In other words, an angle difference between the trajectory (speed) of another vehicle M1 and the actual road marking AL_2 of the lane L2 is smaller than an angle difference between the trajectory (speed) of another vehicle M1 and the actual road marking AL_1 of the lane L1. As another example, in a case where lane change occurs generally, an actual road marking AL_1 of a pre-change lane may become not clear with respect to an actual road marking AL_2 of a lane change target lane (in FIG. 4, drawn as a dotted line). For this reason, the recognition unit 130 may recognize, as a camera road marking, the actual road marking AL_2 of the lane L2, not the actual road marking AL_1 of the lane L1 that should be recognized as a camera road marking, with reference to the trajectory of another vehicle M1. Accordingly, the determination unit 132 calculates an angle difference a between the recognized camera road marking CL and the map road marking ML as a deviation, and determines that the camera road marking CL and the map road marking ML do not match each other. When the determination unit 132 determines that the camera road marking CL and the map road marking ML do not match each other, the mode determination unit 150 can change the driving mode of the host vehicle M to a driving mode in which the task is heavier, or even in a case where the driving mode of the host vehicle M is maintained, the action plan generation unit 140 can generate a target trajectory based on the camera road marking CL more in line with the trajectory (speed) of another vehicle M1 out of the camera road marking CL and the map road marking ML between which a deviation is generated. As a result, for example, a driving mode (the mode A or the mode B) in which steering gripping is not required may be lowered in level to a driving mode (a driving mode of the mode C or lower) in which steering gripping is required or the behavior of the host vehicle M may deviate from a straight road AL_S that should be selected by the host vehicle and an occupant may feel discomfort.

With this background, in a case where determination is made that the deviation is generated between the camera road marking CL and the map road marking ML in the monitoring range MR, the determination unit 132 whether the deviation is a deviation in which a lane width of the camera road marking CL or the map road marking ML is widened. As an example, the determination unit 132 determines whether a deviation in which the lane width of the camera road marking CL or the map road marking ML is gradually widened from a side close to the host vehicle toward a side far from the host vehicle is generated in relation to the moving direction of the host vehicle M. Here, "gradually widened" means that the recognized camera road marking CL is continuously widened outward as shown in FIG. 4. As another example, the determination unit 132 determines whether the camera road marking CL (in FIG. 4, a right side of a road marking) deviates to be widened outward from the map road marking ML in relation to the moving direction of the host vehicle M. As still another example, the determination unit 132 determines whether a current point is a point where the lane width increases, with reference to the second map information 62.

Figure 5:
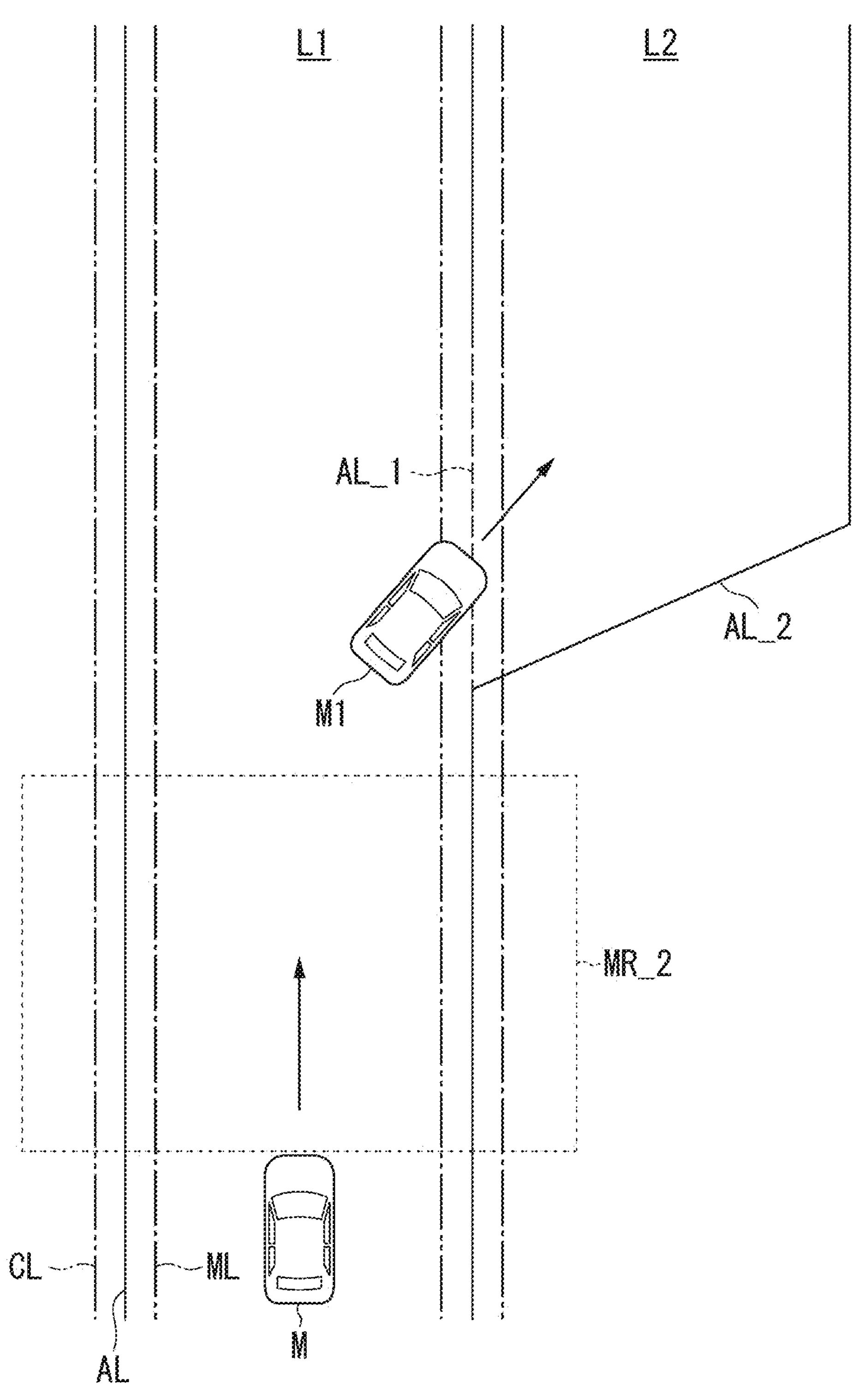
FIG. 5 is a diagram showing an example of a monitoring range obtained by change in setting by a determination unit.

In a case where determination is made that the deviation is a deviation in which a lane width of the camera road marking CL or the map road marking ML is widened, the determination unit 132 obtains a monitoring range MR_2 after change in setting by changing a setting such that the monitoring range MR becomes small. FIG. 5 is a diagram showing an example of the monitoring range MR_2 obtained with change in setting by the determination unit 132. As shown in FIG. 5, the determination unit 132 sets the monitoring range MR_2 smaller than the monitoring range MR in relation to the moving direction of the host vehicle M. As described above, since the determination unit 132 sets the monitoring range MR_2 according to the speed of the host vehicle M, for example, the determination unit 132 sets a longitudinal distance of the monitoring range MR_2 to a distance (where $Y<X$) equivalent to Y seconds in front from a distance equivalent to X seconds in front.

Figure 6:
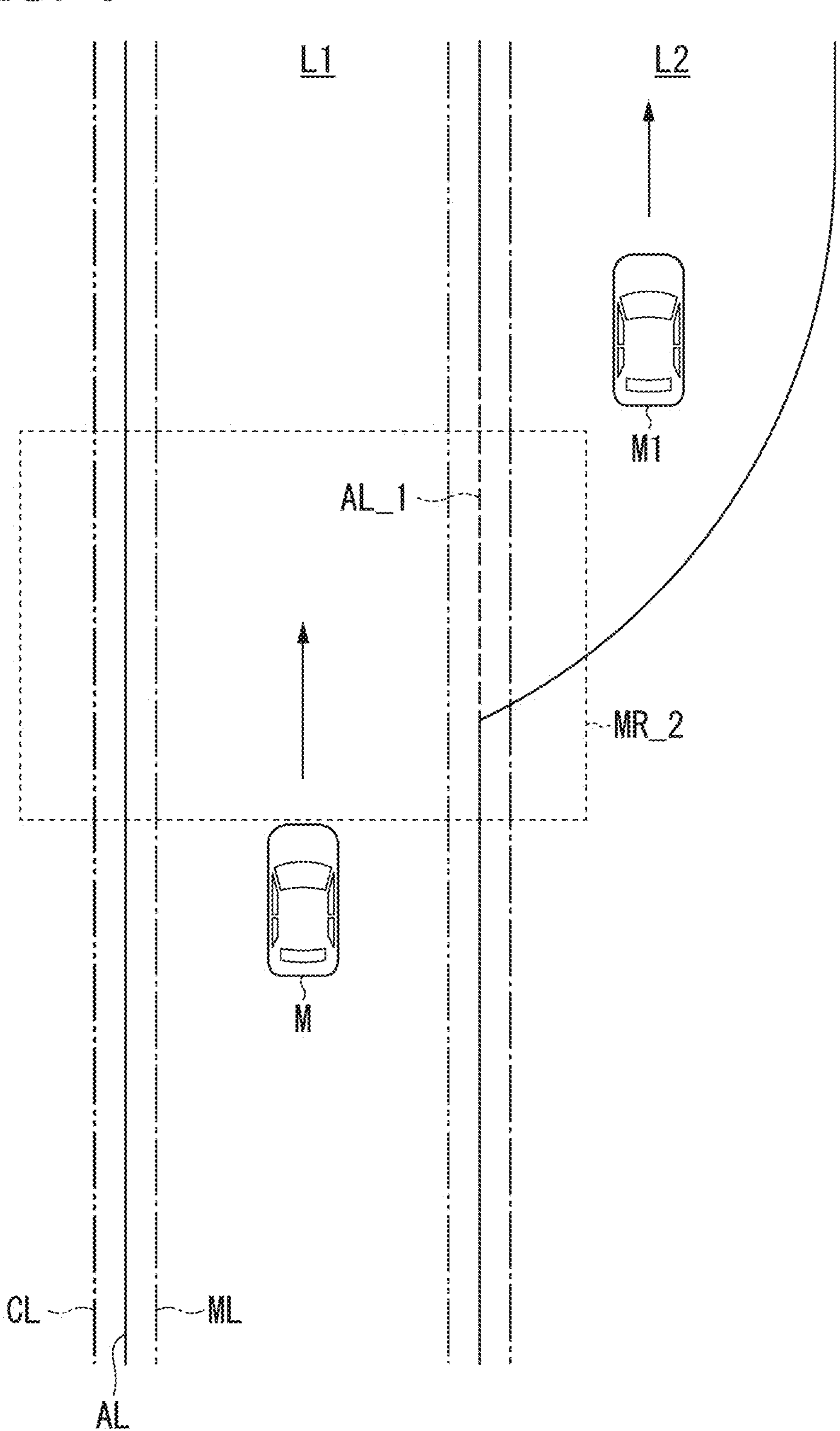
FIG. 6 is a diagram showing an example of traveling control in a case where the monitoring range is set.

FIG. 6 is a diagram showing an example of traveling control in a case where the monitoring range MR_2 is set. FIG. 6 shows traveling control for the host vehicle M after the determination unit 132 sets the monitoring range MR_2 in FIG. 5. As shown in FIG. 5, since another vehicle M1 is excluded from the monitoring range MR_2, the recognition unit 130 recognizes the actual road marking AL_1 of the lane L1 without reference to the traveling state of another vehicle M1 traveling in front of the host vehicle M. For this reason, the determination unit 132 determines that the camera road marking CL and the map road marking ML match each other on both sides, and the mode determination unit 150 continues a current driving mode. For example, in a case where the host vehicle M is traveling in a driving mode (the mode A or the mode B) in which steering gripping is not required, the mode determination unit 150 continues the driving mode. With this, it is possible to appropriately continue traveling control for the host vehicle even in a case where the trajectory of the preceding vehicle deviates from the host vehicle.

In the description of FIGS. 4 to 6, as an example, the increase in lane width is expressed as an increase in the number of lanes from one lane to two lanes. However, the present invention is not limited to such a configuration, and the increase in lane width may be an increase in the number of lanes from a plurality of lanes to a plurality of lanes or may be an increase in width of a single lane.

Processing when ACC is Executed

In a case where autonomous driving or driving assistance in the driving modes of the mode A to the mode D is applied, in the host vehicle M, the above-described ACC may be executed. The ACC is traveling control to make the host vehicle M follow another vehicle M1 while maintaining an inter-vehicle distance between the host vehicle M and another vehicle M1 at a given distance. For this reason, to validate change in setting of the monitoring range MR even when ACC is being executed, the determination unit 132 sets the longitudinal distance of the monitoring range MR_2 smaller than the inter-vehicle distance specified in ACC.

Figure 7:
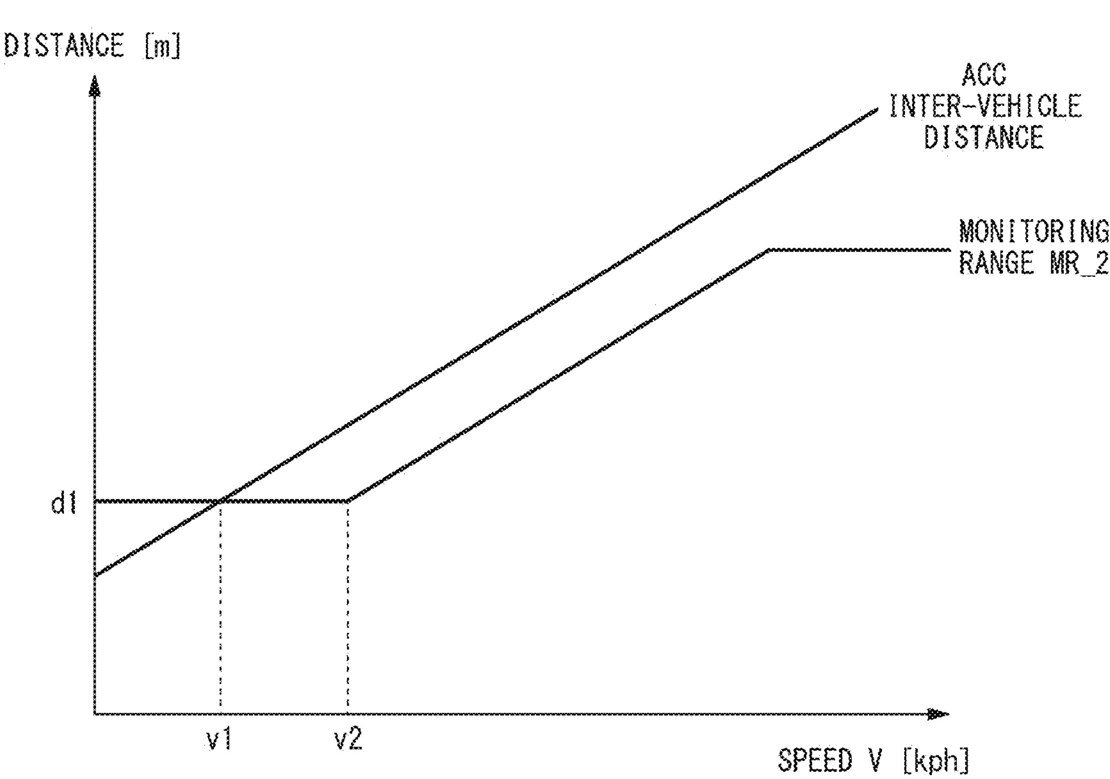
FIG. 7 is an example of a graph showing a relationship between an inter-vehicle distance for ACC and a longitudinal distance of the monitoring range.

FIG. 7 is an example of a graph showing a relationship between the inter-vehicle distance for ACC and the longitudinal distance of the monitoring range MR_2. In FIG. 7, the vertical axis represents a distance [m], and the horizontal axis represents a speed [kph]. As shown in FIG. 7, in a case where the speed of the host vehicle M is equal to or higher than v1, the determination unit 132 sets the longitudinal distance of the monitoring range MR_2 to a value smaller than the inter-vehicle distance for ACC. The longitudinal distance of the monitoring range MR_2 is set to a given value d1 in a range in which the speed of the host vehicle M is equal to or lower than v2. This is because comparison accuracy of the camera road marking CL and the map road marking ML required for autonomous driving or driving assistance is adversely affected when the longitudinal distance of the monitoring range MR_2 is set smaller than the given value. For this reason, in a case where the speed of the host vehicle M is lower than v1, the longitudinal distance of the monitoring range MR_2 is set to a value greater than the inter-vehicle distance for ACC. In this case, since the speed of the host vehicle Mis low, even in a case where the camera road marking CL is misrecognized due to the effect of the preceding vehicle, and the host vehicle M is steered in a direction different from a direction in which the host vehicle M should be traveling, the driver can easily eliminate the trouble by, for example, steering.

Competition with Processing on Branch Road

In this way, in a case where determination is made that the deviation in which the lane width increases is generated, the determination unit 132 resets the monitoring range. Meanwhile, when the host vehicle M travels on a branch road, the branch road includes an increase in lane width at a start point, but control different from the logic according to the present invention is applied. For this reason, even in a case where determination is made that the deviation in which the lane width increases is generated, the determination unit 132 determines whether a current point is positioned on a branch road, with reference to the second map information 62, and in a case where determination is made that the current point is positioned on the branch road, does not reset the monitoring range.

Figure 8:
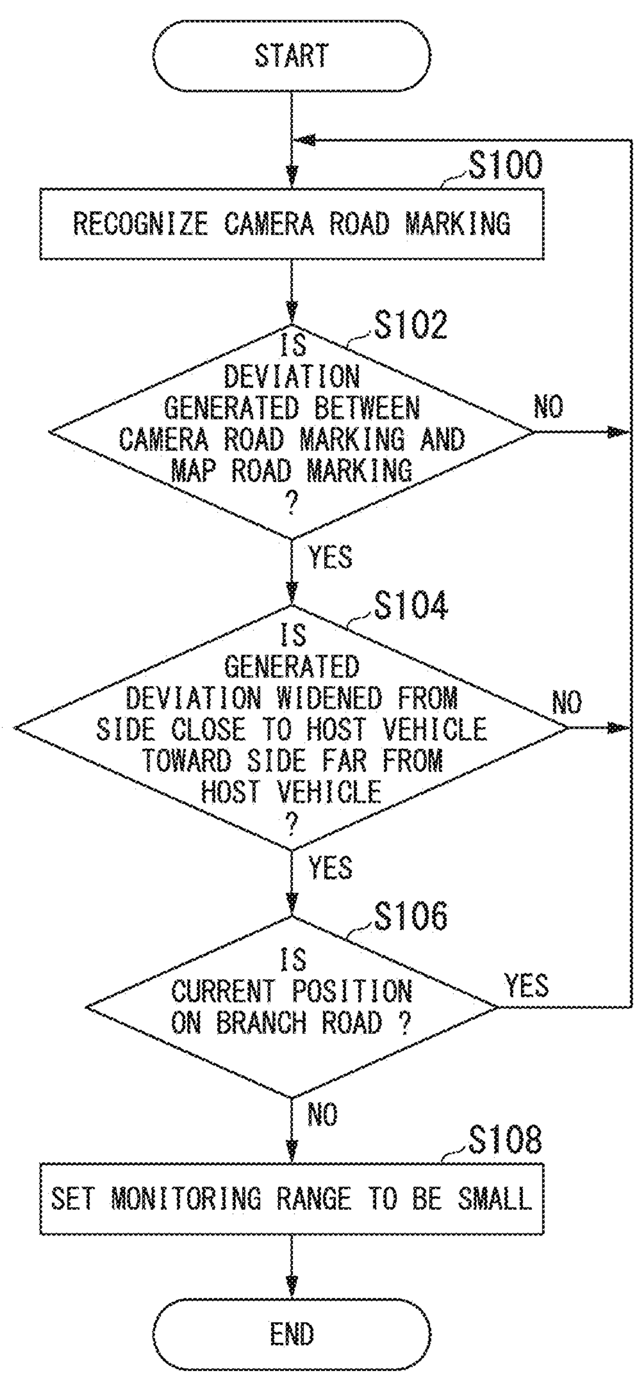
FIG. 8 is a flowchart illustrating an example of a flow of processing that is executed by an autonomous driving control device.

Next, a flow of processing that is executed by the autonomous driving control device 100 will be described with reference to FIG. 8. FIG. 8 is a flowchart illustrating an example of a flow of processing that is executed by the autonomous driving control device 100. The processing of the flowchart shown in FIG. 8 is repeatedly executed when the host vehicle M is traveling in any driving mode of the mode A to the mode D described above, for example.

First, the recognition unit 130 recognizes the camera road marking present in the moving direction of the host vehicle M (Step S100). Next, the determination unit 132 determines whether a deviation is generated between the recognized camera road marking and the map road marking (Step S102). In a case where determination is made that a deviation is not generated between the recognized camera road marking and the map road marking, the determination unit 132 returns the process to Step S100. On the other hand, in a case where determination is made that a deviation is generated between the recognized camera road marking and the map road marking, the determination unit 132 determines whether the generated deviation is widened from a side close to the host vehicle toward a side far from the host vehicle in relation to the moving direction of the host vehicle M (Step S104).

In a case where determination is made that the generated deviation is not widened from the side close to the host vehicle toward the side far from the host vehicle in relation to the moving direction of the host vehicle M, the determination unit 132 returns the process to Step S100. On the other hand, in a case where determination is made that the generated deviation is widened from the side close to the host vehicle toward the side far from the host vehicle in relation to the moving direction of the host vehicle M, the determination unit 132 determines whether the current point is positioned on the branch road (Step S106). In a case where determination is made that the current point is positioned on the branch road, the determination unit 132 returns the process to Step S100. On the other hand, in a case where determination is made that the current point is not positioned on the branch road, the determination unit 132 sets the monitoring range MR small (Step S108). With this, the processing of the present flowchart ends.

In the above-described flowchart, an order of Steps S104 and S106 may be reversed or the processing of Steps S102 and S104 may be executed simultaneously.

According to the present embodiment described above, in a case where the deviation in which the lane width of the camera road marking or the map road marking is widened is generated in the monitoring range, the monitoring range is set small. With this, it is possible to appropriately continue traveling control for the host vehicle even in a case where the trajectory of the preceding vehicle deviates from the host vehicle.

The above-described embodiment can be expressed as follows.

A vehicle control device including a storage medium that stores computer-readable instructions, and a processor connected to the storage medium, in which the processor executes the computer-readable instructions to recognize a road marking and another vehicle present in a moving direction of a vehicle, determine whether the recognized road marking deviates from map road marking based on map information stored in a storage unit in a monitoring range, in a case where determination is made that the deviation is generated, and the other vehicle is present in the monitoring range, select the road marking or the map road marking according to a traveling state of the other vehicle and perform traveling control for the vehicle according to the selected road marking or map road marking, and set the monitoring range to be small in a case where determination is made that the deviation in which a lane width of the road marking or the map road marking is widened is generated.

While a mode for carrying out the present invention has been described using the embodiment, the present invention is not limited to such an embodiment, and various modifications and replacements can be made without departing from the spirit of the present invention.

What is claimed is:

1. A vehicle control device comprising:

a storage medium that stores computer-readable instructions; and a processor connected to the storage medium, wherein the processor executes the computer-readable instructions to recognize a road marking and another vehicle present in a moving direction of a vehicle, determine whether the recognized road marking deviates from map road marking based on map information stored in a storage unit in a monitoring range, and in a case where determination is made that the deviation is generated, and the other vehicle is present in the monitoring range, select the road marking or the map road marking according to a traveling state of the other vehicle and perform traveling control for the vehicle according to the selected road marking or map road marking, and the processor sets the monitoring range to a value smaller than an inter-vehicle distance between the vehicle and the other vehicle in a case where determination is made that the deviation in which a lane width of the road marking or the map road marking is widened is generated.

2. The vehicle control device according to claim 1, wherein the deviation in which the lane width of the road marking or the map road marking is widened is a deviation in which the lane width is gradually widened from a side close to the vehicle toward a side far from the vehicle in relation to the moving direction of the vehicle.

3. The vehicle control device according to claim 1, wherein the processor decreases the value of the monitoring range in a case where one of right and left sides of the road marking deviates to be widened from the corresponding map road marking in relation to the moving direction of the vehicle.

4. The vehicle control device according to claim 1, wherein the processor changes the monitoring range according to a vehicle speed of the vehicle.

5. The vehicle control device according to claim 4, wherein the processor sets a longitudinal distance of the monitoring range to a value smaller than the inter-vehicle distance that is set for traveling to follow the other vehicle in a case where determination is made that the deviation in which the lane width of the road marking or the map road marking is widened is generated.

6. The vehicle control device according to claim 5, wherein the processor sets the longitudinal distance of the monitoring range to a given value in a case where determination is made that the deviation in which the lane width of the road marking or the map road marking is widened is generated, and the vehicle speed of the vehicle is equal to or lower than a prescribed value.

7. The vehicle control device according to claim 1, wherein the processor determines whether the vehicle is positioned on a branch road, and in a case where determination is made that the vehicle is positioned on the branch road, does not decrease the monitoring range even in a case where determination is made that the deviation in which the lane width of the road marking or the map road marking is widened is generated.

8. A vehicle control method comprising:

by a computer mounted in a vehicle, recognizing a road marking and another vehicle present in a moving direction of the vehicle;

determining whether the recognized road marking deviates from map road marking based on map information stored in a storage unit in a monitoring range;

in a case where determination is made that the deviation is generated, and the other vehicle is present in the monitoring range, selecting the road marking or the map road marking according to a traveling state of the other vehicle and performing traveling control for the vehicle according to the selected road marking or map road marking; and setting the monitoring range to a value smaller than an inter-vehicle distance between the vehicle and the other vehicle in a case where determination is made that the deviation in which a lane width of the road marking or the map road marking is widened is generated.

9. A computer-readable non-transitory storage medium storing a program for causing a computer mounted in a vehicle to:

recognize a road marking and another vehicle present in a moving direction of the vehicle;

determine whether the recognized road marking deviates from map road marking based on map information stored in a storage unit in a monitoring range;

in a case where determination is made that the deviation is generated, and the other vehicle is present in the monitoring range, select the road marking or the map road marking according to a traveling state of the other vehicle and perform traveling control for the vehicle according to the selected road marking or map road marking; and set the monitoring range to a value smaller than an inter-vehicle distance between the vehicle and the other vehicle in a case where determination is made that the deviation in which a lane width of the road marking or the map road marking is widened is generated.

* * * * *